June 21, 1955  M. ROMAINE ET AL  2,711,114
CROSS SLIDE MECHANISM
Filed Oct. 22, 1951
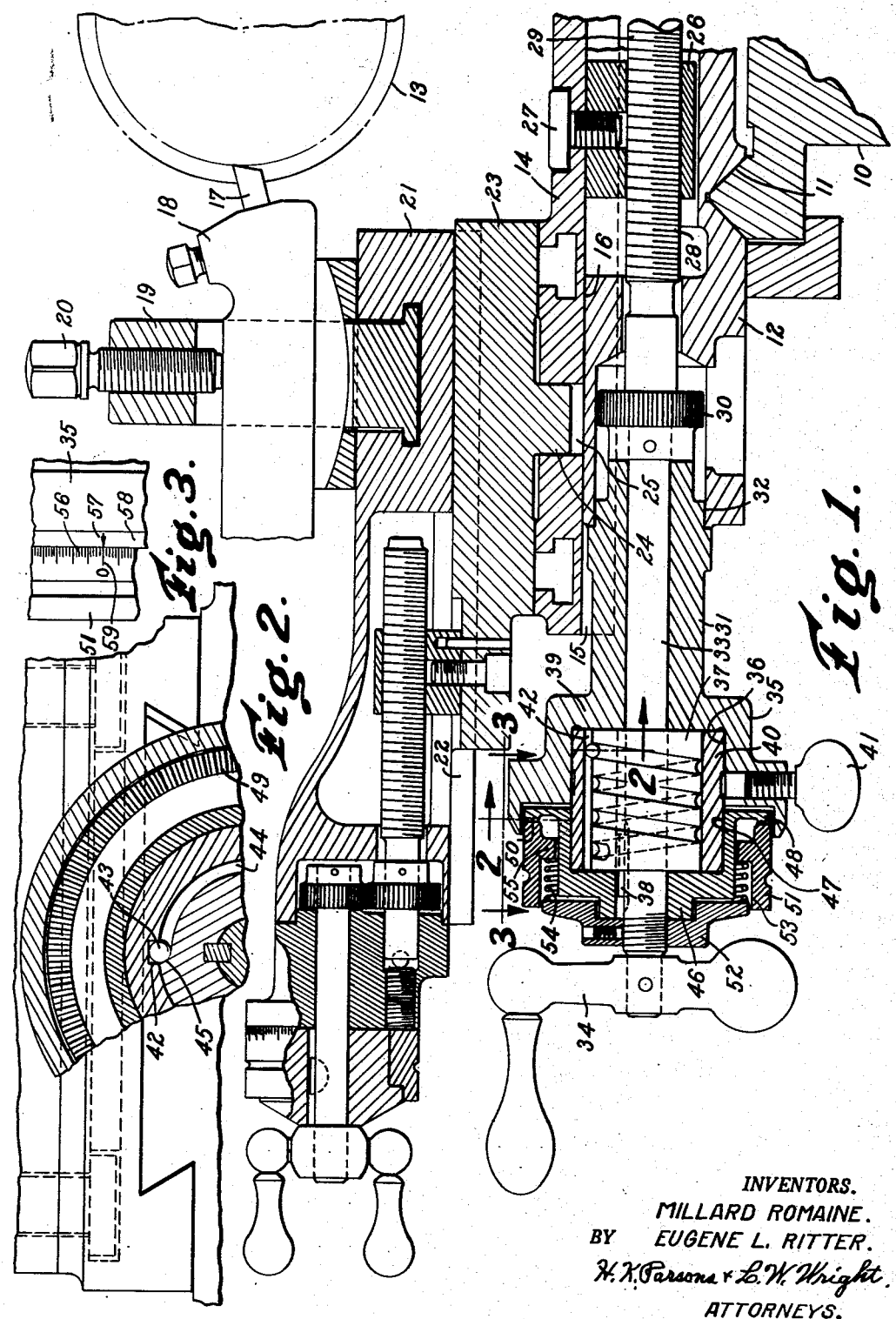
INVENTORS.
MILLARD ROMAINE.
BY EUGENE L. RITTER.
H. K. Parsons + L. W. Wright
ATTORNEYS.

2,711,114

CROSS SLIDE MECHANISM

Millard Romaine and Eugene L. Ritter, Cincinnati, Ohio, assignors to The Cincinnati Milling Machine Co., Cincinnati, Ohio, a corporation of Ohio Application October 22, 1951, Serial No. 252,531

1 Claim. (Cl. 82—21)

This invention relates to lathes and more particularly to improvements in cross slide mechanisms therefor which will improve the accuracy of repetitive production operations.

In the performance of accurate machining operations on a lathe it is advantageous to provide the cross slide mechanism with a positive stop arrangement to assist the operator in quickly resetting the tool for the cutting operation on the next work piece and to do so accurately whereby successive work pieces will be produced to the same size.

For the guidance of the operator in setting up for a particular operation and for future adjustments during the running of a job, cross slide mechanisms are provided with micrometer means which may be set to zero so as to be used as a reference from which further adjustments may be made.

In the past, such indicator means have been in the form of a graduated micrometer ring fitted on the actuated shaft and held for rotation therewith by friction means. The operator by overcoming the friction means is enabled to turn the micrometer ring with respect to its actuator in making future settings. It has been found, however, that continuous use of the mechanism such as moving the slide back and forth at fast rates, and especially in suddenly encountering the positive stop, tends to cause the dial to creep and thereby disturb the setting of the micrometer dial ring, resulting in confusion to the operator, mistakes in adjusting and resetting the dial, and work spoilage.

It is, therefore, an object of this invention to improve upon prior constructions and provide a new and improved arrangement in connection with cross slide mechanisms having a positive stop by insuring against slippage in the micrometer mechanism by positively connecting it to the actuator whereby sudden stops of the actuator or momentum of the micrometer ring will not cause the dial to creep from its intended position, thus rendering the indicating mechanism reliable at all times, so that the operator will have full confidence in its reading.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claim, without departing from or exceeding the spirit of the invention.

Referring to the drawings in which like reference numerals indicate like or similar parts:

Figure 1 is a sectional view of a cross slide mechanism embodying the principles of this invention.

Figure 2 is a detail section on the line 2—2 of Figure 1.

Figure 3 is a detail view as viewed on the line 3—3 of Figure 1.

Referring to Figure 1 of the drawings, the reference numeral 10 indicates a portion of a machine tool bed, such as the bed of a lathe, and one of the guideways formed on the top of the bed is indicated generally by the reference numeral 11. A portion of a carriage slidably mounted on the guideways 11 is indicated generally by the reference numeral 12.

In a lathe, well-known means are provided for supporting a work piece such as indicated diagrammatically by the reference numeral 13 for rotation about an axis parallel to the axis of the guideway 11 whereby the carriage 12 moves along the guideway parallel to the axis of the work. The carriage 12 is provided with a cross slide, indicated generally by the reference numeral 14, having guide surfaces, one of which is indicated by the reference numeral 15 by which it is guided for movement on the bearing surface 16 of the carriage. The cross slide thus moves at right angles to the axis of the work and axis of the guideway 11 and is utilized for adjusting the position of a cutting tool 17 toward and from the axis of the work for determining its size. The cutting tool 17 is illustrated as supported in a tool holder 18 which is suitably secured in a toolpost 19 by the clamping screw 20. The tool post is mounted in a compound, indicated generally by the reference numeral 21, which is slidably mounted by guideway means indicated generally by the reference numeral 22 on a swivel plate 23 which is carried by the cross slide 14 and swivels about a central boss 24 fitted in the bore 25 of the carriage 14.

The actuating mechanism for the cross slide comprises a nut 26 which is fastened to the cross slide as by the clamping screw 27, and a cross feed screw shaft indicated generally by the reference numeral 28 and having a threaded portion 29 which is threaded in the nut. The screw shaft has a gear 30 attached thereto to which a power connection may be applied for power operation of the screw. A sleeve 31 is fixed in a bore 32 of the cross slide, and the gear abuts against one end of the sleeve to hold the shaft against movement in one direction. The shaft portion 33 of the screw shaft extends through and beyond the end of the sleeve and has an operating crank handle 34 secured to the end thereof. The projecting end of the sleeve 31 has an enlarged portion 35 in which is formed a counterbore 36, and a cylindrical member 37 is keyed at 38 to the shaft 33 and mounted in the counterbore against the end wall 39 which thereby holds the shaft against movement in the other direction.

The cylindrical member 37 is surrounded by a sleeve 40 which is freely mounted in the counterbore and adapted to be locked against rotation by a locking screw 41. The cylindrical member and the sleeve constitute opposing members of a positive stop mechanism. In other words, the sleeve 40 has a slot or keyway 42 formed axially thereof as more particularly shown in Figure 2, and a ball 43 is mounted in the keyway, the depth of the keyway being approximately one-half of the diameter of the ball. The cylindrical member has a spiral groove 44 formed therein in the form of a thread, and the depth of this groove is again equal to approximately one-half of the diameter of the ball. The spiral groove does not continue to the ends of the cylindrical member but stops short of each end and forms an abutting wall such as 45 at each end whereby when the cylindrical member has been rotated sufficiently, the ball 43 abuts the wall 45 and since the ball is further held against movement by the keyway 42, the combination forms a positive stop to limit rotation in one direction or the other. In other words, this arrangement permits a predetermined number of revolutions of the crank 34 before the stop engages. This allows a limited movement of the tool 17 back and forth toward the work so that the tool may be retracted sufficiently to clear the work so that a finished work piece may be removed and a new work piece inserted in the machine without interference from the tool. When it is desired to adjust the machine for a different size of work piece the clamping screw 41 is backed off whereby the sleeve is free to rotate with the cylindrical member, thus rending the stop mechanism ineffective.

The shaft portion 33 also has a clutch member 46 positively keyed therewith, and this clutch member has a counterbore 47 formed therein which overlaps the end of the sleeve to enclose the same and is further provided with a flange portion 48 upon the vertical face of which are formed serrated clutch teeth 49. These clutch teeth are adapted to be engaged by similarly formed clutch teeth 50 formed on the end face of a micrometer dial ring 51 which surrounds the clutch member and is supported thereby for axial movement as well as rotating movement relative thereto.

An end plate 52 is secured to the end of the shaft member 33 in abutting relation to the end of the clutch member and is enlarged to close the end of a counterbore 53 formed in the end of the micrometer ring and serve as an abutment for a spring 54 mounted in the counterbore; the other end of the spring engaging an internal flange 55 formed on the ring member for holding the clutch teeth of the ring member in engagement with the clutch teeth of the clutch member. The dial ring 51, as shown in Figure 3, has micrometer graduations 56 formed around its periphery and adapted to coact with a zero reference mark 57 formed on the beveled edge 58 of the sleeve 35.

The device operates in the following manner. The operator loosen the set screw 41 whereby all the parts move together upon rotation of the crank 34 by the operator, and the rotation of the screw is not limited in any way by the stop mechanism because it has been released. The operator then loads the work, and the tool is moved by trial to the proper depth in the work to effect turning of the work to a predetermined dimension. With the parts in this position, the operator locks the set screw, thus securing the sleeve 40 against rotation and rendering the positive stop mechanism effective. The operator then sets the dial ring to a zero reading by retracting the ring against the force of the spring 54 and turning the dial until the zero mark, such as 59, is in registry with the mark 57. The operator may now retract the tool by rotation of the crank 34 which retracts the cross slide and then after the work has been changed, the crank 34 may be rotated in the other direction until the positive stop engages, thereby limiting the movement of the tool to a desired position, thereby insuring that the next work surface produced will be the same size as the last one.

It is obvious that the full depth of cut does not have to be removed in a single pass of the tool, but successive passes may be made, the amount removed being indicated by the dial for each pass until the positive stop is reached.

In production operations the operator will rotate the handle 34 pretty fast in advancing and retracting the tool, but due to the fact that the dial is positively clutched to the shaft there is no danger of the dial ring being jarred out of position when the positive stop hits. It will thus be obvious that a new and improved mechanism has been provided, especially for cross slide mechanisms of lathes whereby the possibility of slippage between the measuring elements is eliminated with its resultant possibilities of error in reproducing work.

What is claimed is:

In a lathe having a carriage and a cross feed screw shaft journaled in a housing on said carriage and projecting beyond a face of said housing, the combination of stop means for said screw including a cylindrical member fixed on the shaft against said face, a sleeve telescopingly fitted on said cylindrical member and against said face for free movement relative thereto, a clutch member fixed on the screw in abutting relation to the cylinder and sleeve for holding the sleeve against axial movement relative to the cylinder, said sleeve having an axial spline groove formed on the interior thereof, said cylinder having a discontinuous spiral groove in its periphery, a ball mounted in said spline groove, means to clamp the sleeve to said housing to limit rotary movement of the cylinder, a graduated micrometer ring having a zero graduation mark thereon supported on and clutched to said clutch member through clutch teeth for rotation therewith, a plate fixed to said shaft next to the clutch member, and spring means between the plate and ring to maintain engagement of said clutch teeth and permit withdrawal for resetting purposes.

References Cited in the file of this patent
UNITED STATES PATENTS

| | | |
|---|---|---|
| 1,235,437 | Chard | July 31, 1917 |
| 2,319,480 | Saving et al. | May 18, 1943 |
| 2,373,934 | Williams | Apr. 17, 1945 |
| 2,450,788 | Foster | Oct. 5, 1948 |